United States Patent
O'Hanlon, Jr. et al.

[15] 3,648,688
[45] Mar. 14, 1972

[54] PULSE JITTER MEASUREMENT

[72] Inventors: James F. O'Hanlon, Jr.; Glenn A. Sanderson, both of Santa Barbara, Calif.

[73] Assignee: Human Factors Research Incorporated, Goleta, Calif.

[22] Filed: July 20, 1970

[21] Appl. No.: 56,466

[52] U.S. Cl. ..................128/2.06 A, 235/150.3, 324/78 E
[51] Int. Cl. .......................................................A61b 5/04
[58] Field of Search..................235/150.3, 150.4; 324/77 R, 324/78 E, 78 R, 78 S, 78 Z; 128/2.06 R, 2.06 F, 2.06 R, 2.05 T

[56] References Cited

UNITED STATES PATENTS

| | | | |
|---|---|---|---|
| 3,209,251 | 9/1965 | Edaington et al. | 324/78 E |
| 3,438,368 | 4/1969 | Karsh | 128/2.06 A |
| 3,466,526 | 9/1969 | Cole | 324/78 E |
| 3,518,983 | 7/1970 | Jorgensen | 128/2.06 A |
| 3,553,597 | 1/1971 | Bugay | 324/78 E |
| 3,496,536 | 2/1970 | Wheeler et al. | 235/150.3 |
| 2,566,085 | 8/1951 | Green et al. | 235/150.3 |

FOREIGN PATENTS OR APPLICATIONS

| | | | |
|---|---|---|---|
| 1,803,010 | 1/1970 | Germany | 128/2.06 A |

*Primary Examiner*—William E. Kamm
*Attorney*—Harris, Kiech, Russell & Kern

[57] ABSTRACT

Apparatus for measuring the difference in intervals between pulses of a pulse train and providing continually updated output indicative of the running interval variation. Circuitry for generating voltages varying in proportion to the pulse intervals, and for calculating the square root of the difference between the average of the sum of the squares of the interval voltages and the square of the average of the sums of the interval voltages to produce an output signal characteristic of the amount of jitter in the pulse train for reading and display. A specific example for measurement of heart rate jitter.

4 Claims, 3 Drawing Figures

Patented March 14, 1972

INVENTORS.
JAMES F. O'HANLON, JR.
GLENN A. SANDERSON

BY THEIR ATTORNEYS.
HARRIS, KIECH, RUSSELL & KERN

Patented March 14, 1972
3,648,688
2 Sheets-Sheet 2
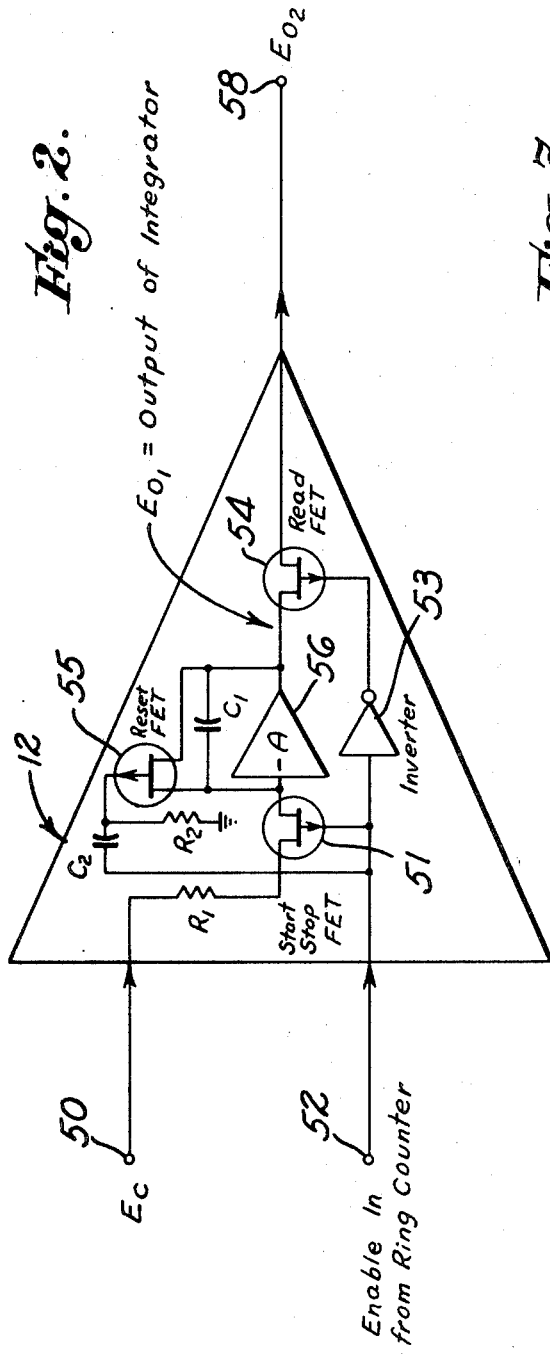
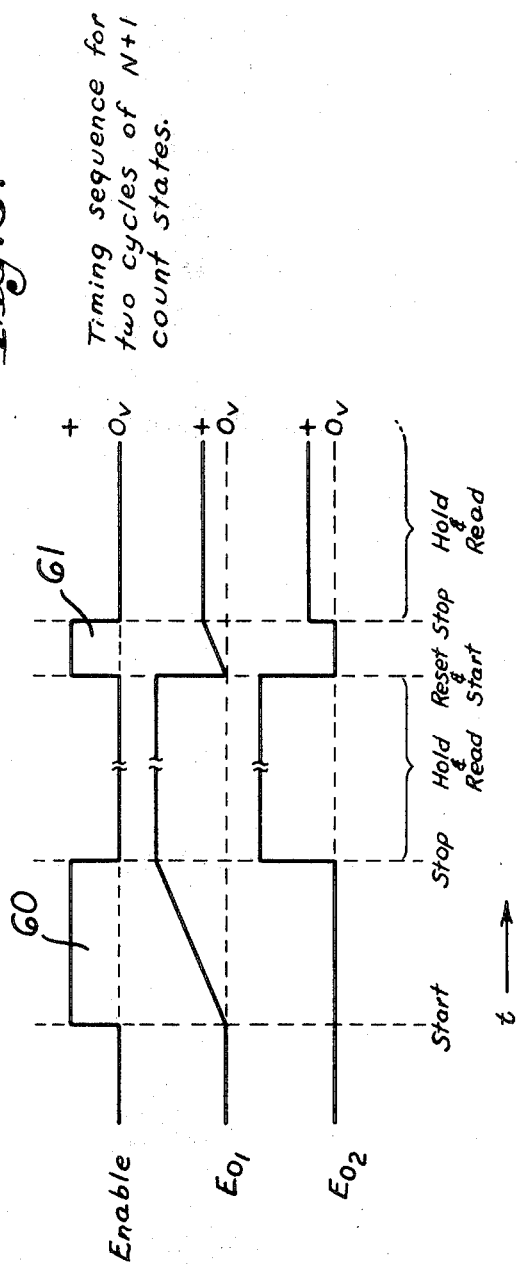
INVENTORS.
JAMES F. O'HANLON, JR.
GLENN A. SANDERSON
BY THEIR ATTORNEYS.
HARRIS, KIECH, RUSSELL & KERN

PULSE JITTER MEASUREMENT

This invention relates to apparatus for the measurement of intervals between pulses of a train of pulses, and in particular to the measurement of the variation in the interpulse intervals.

One characteristic of a train of pulses is the interval between pulses and the variation in duration of this interval. While the average pulse rate or pulse frequency of the output of an oscillator or other source of electrical pulses may be constant, there still can be wide variations in the interpulse intervals, which variation is sometimes referred to as pulse jitter. The amount of pulse jitter in a pulse train is one of the factors in analyzing a pulse train and it is sometimes desirable to be able to measure the pulse jitter independent of the average pulse rate.

It is an object of the present invention to provide an apparatus for measuring the intervals between pulses and provide an output indicative of variations in the duration of the interpulse interval. It is a further object to provide such apparatus which can operate continuously for monitoring the pulse source and one which can operate independently of the average pulse rate and hence which can operate with a varying pulse rate.

It is a particular object of the invention to provide such an apparatus for the measurement of heart rate variation and one which will produce a continually updated or running index of heart rate variability.

These and other objects, advantages, features and results will more fully appear in the course of the following description. In the drawings:

FIG. 2 is an electrical diagram of an interval timer suitable for use in the apparatus of FIG. 1; and FIG. 3 is a timing diagram illustrating the operation of the interval timer.

Figure 1:
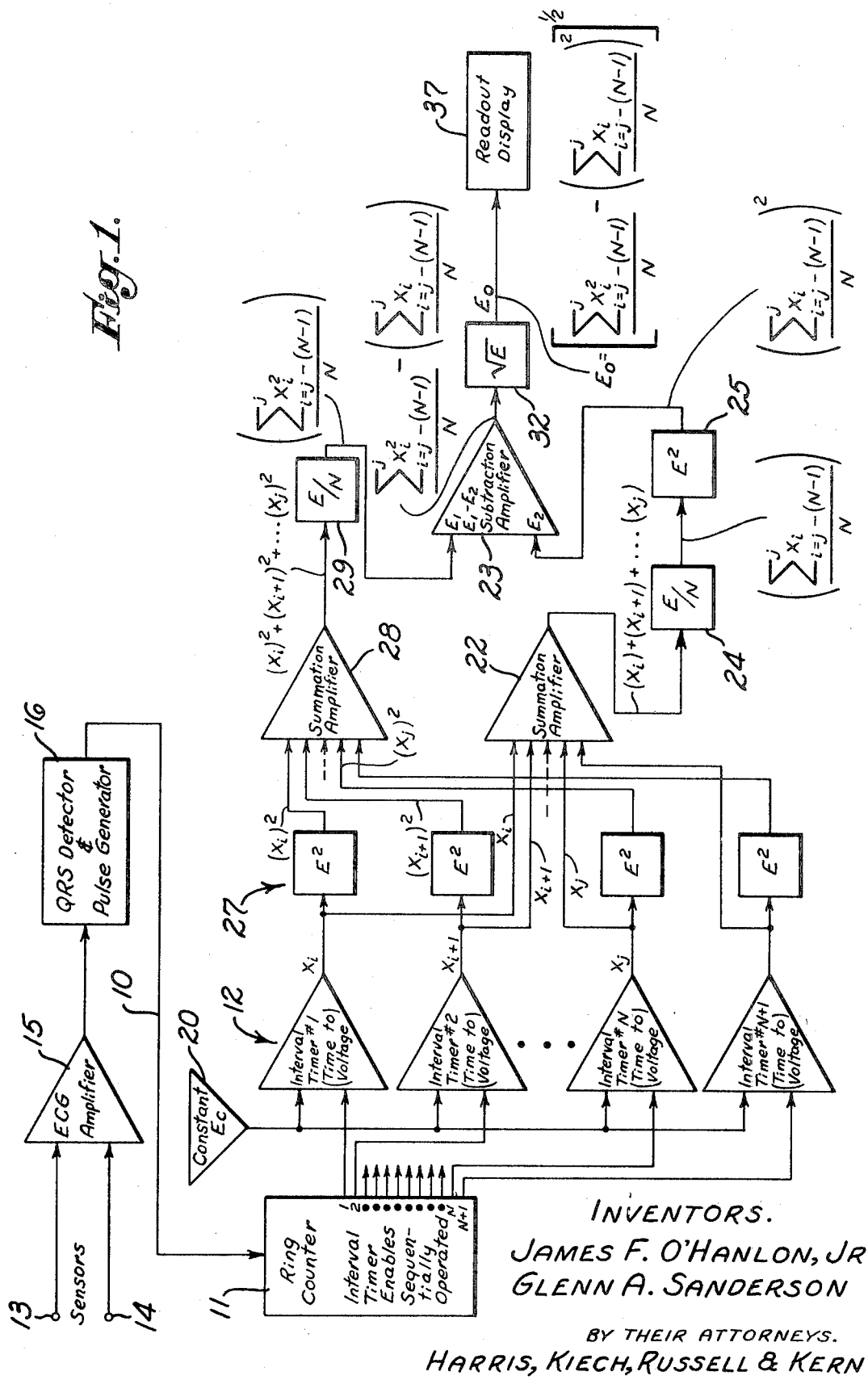
FIG. 1 is an electrical block diagram illustrating apparatus for measuring the pulse jitter in a pulse train, such as produced by the heart beat of a patient, and incorporating a preferred embodiment of the present invention.

In the apparatus of the drawings, the train of pulses to be measured appears on line 10 which is connected as an input to a ring counter 11 having $N+1$ count states with a count state for each of $N+1$ interval timers 12. In the embodiment illustrated, the pulse train is produced by the heart beat of a patient, but other sources of pulse trains such as oscillators, rotating machinery with appropriate electronic sensors, and the like, may be utilized when desired.

Heart beat sensing transducers are utilized to pick up heart beat signals of a patient, such as sensing electrodes 13, 14, placed on the patient for picking up the varying cardiac potentials, with the electrodes connected as inputs to a conventional ECG amplifier 15. The amplifier output is connected to a QRS detector 16 which selects the QRS portion of each heart beat signal to trigger each pulse in the pulse train which is connected on line 10. Alternative sensors (e.g., microphonic or plethysmographic sensors) might be used to detect the heart beat. The outputs of these sensors, suitably amplified, would then be used for triggering the pulse train.

Each pulse of the pulse train arriving at the ring counter 11 triggers the counter to switch its output to the next in a cyclic series of $N+1$ interval timers 12. The output of the ring counter enables that timer to integrate a voltage Ec from the output of a constant voltage source 20. Thus, the total voltage integrated by an interval timer while receiving the output of the ring counter is proportional to the time interval between corresponding pulses in the pulse train.

When the ring counter 11 switches its output from one interval timer to the next, two things happen: the integrated voltage in the first timer is delivered and held as that timer's output; and the second timer is reset, ceases its output (if any), and begins integrating voltage from the constant source.

When the ring counter has switched its output through $N$ interval timers, the outputs of those $N$ interval timers are used for computing and displaying a measure of variability, $E_o$, for the corresponding $N$ interpulse intervals according to the scheme shown in the figure. The voltage output $(x)$ of each of $N$ timers may then be represented as $$x_i, x_{i+1}, x_{i+2}...x_j, \text{ respectively}$$

with $j = N +$ the number of counts completed by the ring counter in addition to the initial $N$ counts, and $i = j - (N-1)$, making $N = (j-i)+1$.

Each time the ring counter switches its output from the interval timer No. $N+1$, to the interval timer No. 1, the following occurs:

1. The interval timers are renumerated as shown in Table 1.
2. The outputs of the renumerated interval timers No. 1 through No. $N$ are unchanged but these outputs are reindexed as shown in Table 1.
3. Renumerated interval timer No. $N+1$ (formerly No. 1) is reset and begins integrating voltage from the constant source.
4. The computation and display of the measure of interpulse variability ($E_o$) is updated by the deletion of the most dated interval timer output and the addition of the most recent interval timer output.

This operation is repeated with each pulse following the arrival of the $(N+1)$th pulse at the ring counter. Therefore, it may be 1that the system output, $E_o$, is updated with every pulse arriving after the $(N+1)$th pulse.

TABLE I.—DESIGNATIONS OF INTERVAL TIMERS AND THEIR OUTPUTS AFTER PULSES

| N+1 | | N+2 | | N+3 | |
|---|---|---|---|---|---|
| Timer | Output | Timer | Output | Timer | Output |
| No. 1 | $x_i$ | No. N+1 | ---------- | No. N | $N_j$ |
| No. 2 | $N_{i+1}$ | No. 1 | $x_i$ | No. N+1 | ---------- |
| No. 3 | $x_{i+2}$ | No. 2 | $x_{i+1}$ | No. 1 | $x_i$ |
| . | . | . | . | . | . |
| . | . | . | . | . | . |
| No. N | $x_j$ | No. N−1 | $x_{j-1}$ | No. N−2 | $x_{j-2}$ |
| No. N+1 | ---------- | No. N | $x_j$ | No. N−1 | $x_{j-1}$ |

The outputs of each of the interval timers 12 are connected as inputs to a summation amplifier 22 that provides an output which is the sum of all the inputs thereto. The summed output from the amplifier 22 is connected as an input $E_2$ of a subtraction or difference amplifier 23 via a dividing circuit 24 and a squaring circuit 25. In the dividing circuit 24, the summed output from the amplifier 22 is divided by $N$, and in the squaring circuit 25, the quotient is squared. Only $N$ of the $N+1$ interval timers provide outputs to the summation amplifier at any time. One interval timer is connected to the counter 11, has been reset, and is integrating the input voltage $E_c$.

The output of each of the interval timers is also connected as an input to a corresponding squaring circuit 27, with the outputs of the squaring circuits 27 connected as inputs to another summation amplifier 28. The summed output from the amplifier 28 is connected as the other input $E_1$ of the amplifier 23 via another dividing circuit 29 wherein the summed output is divided by $N$. The mathematical results of the various manipulations of the outputs of the interval timers are indicated on the drawing.

The amplifier 23 provides an output $E_1-E_2$ which is connected as an input to a square root unit 32, with the output being the square root of the input and being $E_o$, the desired result which appears on line 33.

The output $E_o$ becomes a meaningful system output after $N$ interpulse intervals or $N+1$ pulses have transpired. Thereafter, the output $E_o$ is updated with every subsequent pulse in the pulse train in the manner described. This output $E_o$ is presented at a readout display 37, such as a meter or chart recorder or the like. After analog to digital conversion, the output $E_o$ may also be read on a digital meter or printer or the like.

The value of $E_0$ appearing at 33 is a direct indication of the variation in intervals between $N$ successive pulses of the pulse train on the line 10 and is sometimes referred to as a running index of pulse interval variability.

The apparatus is particularly adapted for use with the measurement of heart rate variation and in such an application, the parameter $N$ could be in the range of 5 to 100 and the intervals in the range of 0.3 to 2 seconds.

As an example of the operation of the apparatus, consider an application where $N$ equals 5 and the first five pulse intervals are 0.6, 0.7, 1.0, 0.4 and 0.6 seconds. With the appropriate scale, the value for $E_0$ will be 0.20 seconds. If the next interval is 0.9 seconds, this value will replace the 0.6 value in the calculation and the new result will be 0.21 seconds.

A suitable circuit for the interval timer 12 is illustrated in FIG. 2 and the operation of the interval timer is illustrated in the timing diagram of FIG. 3. The reference voltage $E_c$ from the constant voltage source 20 is connected at terminal 50 and is applied through a resistor R1 to a start-stop field effect transistor (FET) 51. The enable pulse from the ring counter 11 is connected at terminal 52 and is applied through an inverter 53 to a read FET 54, and through a capacitor C2 to a reset FET 55, and to the start-stop FET 51. An inverting amplifier 56 is connected between transistors 51 and 54, with a capacitor C1 connected across the output and input of the amplifier 56 to provide an integrating operation.

The interval timer of FIG. 2 is a modified Miller integrator. An interval timer enable pulse is sequentially moved from one output of the ring counter 11 to the next output, with each input pulse from the line 10. When an enable pulse appears at terminal 52, the reset FET 55 conducts for a very short time, discharging capacitor C1 and resetting any previous voltage in the integrator to zero. At this time, the start-stop FET 51 is conducting and the output voltage of the integrator starts to increase linearly with time. When the enable pulse disappears from the terminal 52, the start-stop FET 51 stops conducting and the integrator stops integrating, while holding the voltage value that has been reached. The amplitude of this output voltage $E_{01}$ is therefore proportional to the duration of the enable pulse at the terminal 52, which in turn is proportional to the interpulse interval. The read FET 54 can now conduct, permitting the output voltage of the integrator to appear at output terminal 58.

The interval timer (1) delivers an output voltage proportional to the length of the enable pulse from the ring counter, (2) exhibits no output voltage until the interval-to-voltage conversion has taken place, (3) holds the output voltage until a new conversion is initiated, and (4) automatically resets to zero output voltage when a new enable pulse is received.

Since an interval timer provides no output voltage at the output terminal during the period an integration is occurring, one of the $N+1$ timers always has no output voltage (the timer which has an enable pulse connected thereto from the ring counter). Therefore in order to have $N$ voltages for the apparatus, $N+1$ count states in the ring counter and $N+1$ interval timers are required.

FIG. 3 illustrates the operation of an interval timer with an enable pulse 60 of relatively long duration and a succeeding enable pulse 61 of relatively short duration. The second curve of FIG. 3 illustrates the integrating and holding action and the third or bottom curve illustrates the output as held and read between integrating operations.

While the ring counter 11 is illustrated for controlling the outputs of the interval timers in response to the pulse train, it will be recognized that other control circuitry may be utilized for this purpose. Further, other applications of the invention are possible and the embodiment disclosed may be subjected to various changes, modifications and substitutions without necessarily departing from the spirit of the invention.

We claim:

1. In an apparatus for measuring the difference in intervals between pulses of a pulse train, the combination of:

$N+1$ interval timers for generating $N$ output voltage $x_i, x_{i+1}...x_j$ proportional to the duration of an input interval, where $N$ equals a preselected number of interpulse intervals $(j-i)+1$;

means for starting, stopping and resetting each of said interval timers in sequence in response to successive pulses of the pulse train;

$N+1$ squaring circuits, each having an input $x$ and producing an output $x^2$, with each interval timer output connected to a corresponding squaring circuit input;

a first summation circuit having $x_i, x_{i+1}...x_j$ as inputs and providing a first summed output which is the sum of the inputs;

a second summation circuit having $x_i^2, x_{(i+1)}^2...x_j^2$ as inputs and providing a second summed output which is the sum of the inputs;

circuit means for dividing each of said summed outputs by $N$ providing first and second divided outputs;

another squaring circuit for squaring said first divided output;

a difference circuit having said squared first divided output and said second divided output as inputs and producing an output which is the difference of the inputs; and a square root circuit having said difference output as an input and providing an output which is the square root of the input and which is an indication of the variations in interval between $N$ successive pulses of the pulse train.

2. An apparatus as defined in claim 1 including means for reading the output of said square root circuit after each pulse of the pulse train and means for displaying the value read.

3. An apparatus as defined in claim 1 in which said means for starting and stopping and resetting said timers includes a ring counter having $N+1$ count states and being advanced a count state by each pulse of the pulse train, with said ring counter connected to each of said timers for turning a different timer on when in each count state.

4. An apparatus as defined in claim 1 including heart beat sensing transducers for picking up varying heart beat signals from a patient, and means for amplifying said signals to provide the pulse train.

* * * * *

UNITED STATES PATENT OFFICE
CERTIFICATE OF CORRECTION

Patent No. 3,648,688  Dated March 14, 1972

Inventor(s) James F. O'Hanlon, Jr. et al

It is certified that error appears in the above-identified patent and that said Letters Patent are hereby corrected as shown below:

Column 2: Line 23, after "be" delete "1" and insert --said--;

Table 1, N+1, No. 2, "$N_{i+1}$" should read --$x_{i+1}$--.

Column 4: Line 15, "voltage should read --voltages--.

Signed and sealed this 26th day of December 1972.

(SEAL)
Attest:

EDWARD M. FLETCHER, JR.
Attesting Officer

ROBERT GOTTSCHALK
Commissioner of Patents